(12) United States Patent
Yang et al.

(10) Patent No.: US 11,070,544 B2
(45) Date of Patent: *Jul. 20, 2021

(54) RESOURCE ACCESS MANAGEMENT AND SECURE AUTHORIZATION SYSTEMS AND METHODS

(71) Applicant: Intertrust Technologies Corporation, Sunnyvale, CA (US)

(72) Inventors: Peng Yang, Beijing (CN); Jiahua Gong, Beijing (CN); Chitai Kenny Huang, Beijing (CN)

(73) Assignee: Intertrust Technologies Corporation, Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/006,389

(22) Filed: Jun. 12, 2018

(65) Prior Publication Data

US 2019/0098001 A1    Mar. 28, 2019

Related U.S. Application Data

(63) Continuation of application No. 14/286,618, filed on May 23, 2014, now Pat. No. 10,021,091.

(Continued)

(51) Int. Cl.
*H04L 29/00* (2006.01)
*H04L 29/06* (2006.01)

(52) U.S. Cl.
CPC ...... *H04L 63/0838* (2013.01); *H04L 63/0807* (2013.01); *H04L 63/10* (2013.01)

(58) Field of Classification Search
CPC ..... H04L 63/08; H04L 63/10; H04L 63/0838; H04L 63/0807
See application file for complete search history.

(56) References Cited

U.S. PATENT DOCUMENTS

| 2003/0163739 A1 | 8/2003 | Armington et al. |
| 2004/0237100 A1 | 11/2004 | Pinder et al. |

(Continued)

FOREIGN PATENT DOCUMENTS

| WO | WO 2004/088947 A1 | 10/2004 |
| WO | WO 2012/165716 A1 | 12/2012 |

OTHER PUBLICATIONS

Hardt, D.; "The OAuth 2.0 Authorization Framework"; accessed at http://tools.ietf.org/html/rfc6749; Oct. 2012; IETF Trust; 93 pages.

(Continued)

*Primary Examiner* — Jeffrey C Pwu
*Assistant Examiner* — Helai Salehi
(74) *Attorney, Agent, or Firm* — Finnegan, Henderson, Farabow, Garrett & Dunner, LLP (57) ABSTRACT

Systems and methods for secure user authentication are described. In certain embodiments, a client device such as a smartphone may be provisioned with a secure key and/or other secret information. The client device may be used to generate unique secure tokens and/or other credentials used in connection with an authentication process. A user may provide the generated tokens and/or other credentials to a service provider in connection with a request to access a managed service. The validity of the generated tokens and/or other credentials may be verified by an authentication service in communication with the service provider.

20 Claims, 7 Drawing Sheets

Related U.S. Application Data (60) Provisional application No. 61/826,613, filed on May 23, 2013.

(56) References Cited

U.S. PATENT DOCUMENTS

| | | | |
|---|---|---|---|
| 2005/0154925 | A1 | 7/2005 | Chitrapu et al. |
| 2009/0165111 | A1 | 6/2009 | Zhang et al. |
| 2009/0228966 | A1* | 9/2009 | Parfene .................. G06F 21/31 |
| | | | 726/7 |
| 2009/0313687 | A1 | 12/2009 | Popp et al. |
| 2011/0197266 | A1* | 8/2011 | Chu ...................... H04L 9/3228 |
| | | | 726/5 |
| 2011/0239283 | A1 | 9/2011 | Chern |
| 2012/0233684 | A1 | 9/2012 | Denis et al. |
| 2014/0040991 | A1 | 2/2014 | Potonniee et al. |
| 2014/0344904 | A1* | 11/2014 | Venkataramani ... H04W 12/068 |
| | | | 726/5 |
| 2016/0261411 | A1* | 9/2016 | Yau ..................... H04L 63/0869 |
| 2018/0137512 | A1* | 5/2018 | Georgiadis ................ H04L 9/14 |

OTHER PUBLICATIONS

M'Raihi, D. et al.; "HOTP: An HMAC-Based One-Time Password Algorithm"; accessed at (http://www.ietf.org/rfc/rfc4226.txt; Dec. 2005; The Internet Society; 31 pages.

M'Raihi, D et al.; "TOTP: Time-Based One-Time Password Algorithm"; accessed at http://tools.ietf.org/rfc/rfc6238.txt); May 2011; IETF Trust; 14 pages.

International Search Report and International Written Opinion dated Mar. 9, 2015 for application No. PCT/2014/039415.

Extended European Search Report dated May 11, 2016 for EP Application No. 14836332.8.

Office Action dated Jul. 29, 2015 for U.S. Appl. No. 14/286,618, filed May 23, 2014.

Final Office Action dated Nov. 20, 2015 for U.S. Appl. No. 14/286,618, filed May 23, 2014.

Office Action dated Apr. 5, 2016, for U.S. Appl. No. 14/286,618, filed May 23, 2014.

Office Action dated May 20, 2016 for U.S. Appl. No. 14/286,618, filed May 23, 2014.

Final Office Action dated Oct. 4, 2016 for U.S. Appl. No. 14/286,618, filed May 23, 2014.

Office Action dated Apr. 18, 2017 for U.S. Appl. No. 14/286,618, filed May 23, 2014.

Final Office Action dated Oct. 2, 2017 for U.S. Appl. No. 14/286,618, filed May 23, 2014.

Notice of Allowance and Fee(s) Due dated Mar. 16, 2018 for U.S. Appl. No. 14/286,618, filed May 23, 2014.

First Office Action dated Apr. 3, 2018, in related Chinese Application No. 201480041639.2.

\* cited by examiner

RESOURCE ACCESS MANAGEMENT AND SECURE AUTHORIZATION SYSTEMS AND METHODS

RELATED APPLICATIONS

This application is a continuation of U.S. application Ser. No. 14/286,618, filed May 23, 2014, and entitled "SECURE AUTHORIZATION SYSTEMS AND METHODS," which claims the benefit of priority under 35 U.S.C. § 119(e) to U.S. Provisional Patent Application No. 61/826,613, filed May 23, 2013, and entitled "SECURE AUTHORIZATION SYSTEMS AND METHODS." Each patent application identified above is incorporated here by reference in its entirety to provide continuity of disclosure.

COPYRIGHT AUTHORIZATION

Portions of the disclosure of this patent document may contain material which is subject to copyright protection. The copyright owner has no objection to the facsimile reproduction by anyone of the patent document or the patent disclosure, as it appears in the U.S. Patent and Trademark Office patent file or records, but otherwise reserves all copyright rights whatsoever.

SUMMARY

User authentication techniques may be used in a variety of applications. For example, user authentication processes may allow a computer system managing a resource such as an online service to verify that a user has rights to access the resource before providing access to the resource (e.g., by validating a user's identity or the like before allowing the user access to sensitive data and/or before allowing the user to perform sensitive operations on data, as is the case with online or point-of-sale financial transactions, providing access to financial, personal, confidential, business, or medical records, and/or the like). Similarly, user authentication may be used in connection with physical access or inventory control systems, allowing for validation of a user's right to physically access protected areas and/or inventory based on demonstrated possession of certain identifying credentials (e.g., access to a building and/or an area within a building or the like, access to medical supply inventory cabinet within a hospital, etc.).

Systems and methods disclosed herein facilitate secure user authentication using one-time password ("OTP") authentication processes. OTP authentication process consistent with the disclosed embodiments may use passwords, keys, and/or other suitable credentials that change over time and/or are valid for a single authentication transaction and/or for a particular period of time. In certain embodiments, passwords, keys, and/or other suitable credentials used in connection with the disclosed OTP authentication processes may be generated based on random and/or pseudorandom processes at a time a user wishes to engage in an authentication transaction. Among other things, OTP authentication processes consistent with embodiments disclosed herein may provide certain benefits over static password authentication processes, including increased protection from replay attacks from nefarious parties.

In certain embodiments, a user may use a client device such as, for example, a smartphone or other mobile device in connection with the disclosed OTP authentication processes. The client device and/or an application executing thereon may be provisioned with a secure key and/or other secret information that may be used to generate tokens, passwords, keys, and/or other credentials used in connection with OTP authentication processes. In some embodiments, the secure key and/or other secret information may be provisioned by an authentication service provider and/or other trusted authority.

Based on the secure key and/or other secret information, the client device may generate a token, password, key, and/or other credential for use in connection with an OTP authentication process. A user of the client device may provide the generated token, password, key, and/or other credential to a system managing a resource (e.g., a service provider system, an access control system, etc.) to validate their rights to access the resource. In certain embodiments, the system may communicate with an authentication service system to validate the authenticity of the token, password, key, and/or other credential provided by the user in connection with determining whether the user has certain rights to access the managed resource.

Using a client device such as a smartphone in connection with embodiments of the disclosed OTP user authentication processes may reduce costs of deployment and/or ease adoption of OTP-based authentication by, e.g., obviating the need for a separate, dedicated authentication device like a keycard or dongle. In addition, some embodiments of the disclosed systems and methods may not require that a client device have certain connectivity to other systems and/or services at a time a token, password, key, and/or other credential is generated and/or otherwise provided to a user, as may be the case in short message service ("SMS") OTP authentication processes. Moreover, use of a third-party authentication service and/or downloadable token authentication applications executing on a client device may ease integration of embodiments of the disclosed secure OTP user authentication processes in connection with a variety of managed resources and/or services.

BRIEF DESCRIPTION OF THE DRAWINGS

The inventive body of work will be readily understood by referring to the following detailed description in conjunction with the accompanying drawings, in which.

DETAILED DESCRIPTION

A detailed description of systems and methods consistent with embodiments of the present disclosure is provided below. While several embodiments are described, it should be understood that the disclosure is not limited to any one embodiment, but instead encompasses numerous alternatives, modifications, and equivalents. In addition, while numerous specific details are set forth in the following description in order to provide a thorough understanding of the embodiments disclosed herein, some embodiments can be practiced without some or all of these details. Moreover, for the purpose of clarity, certain technical material that is known in the related art has not been described in detail in order to avoid unnecessarily obscuring the disclosure.

Embodiments of the disclosure may be understood by reference to the drawings, wherein like parts may be designated by like numerals. The components of the disclosed embodiments, as generally described and illustrated in the figures herein, could be arranged and designed in a wide variety of different configurations. Thus, the following detailed description of the embodiments of the systems and methods of the disclosure is not intended to limit the scope of the disclosure, as claimed, but is merely representative of possible embodiments of the disclosure. In addition, the steps of any method disclosed herein do not necessarily need to be executed in any specific order, or even sequentially, nor need the steps be executed only once, unless otherwise specified.

Embodiments disclosed herein allow for secure user authentication. In certain embodiments, the systems and methods described herein can, for example, be used in connection with digital rights management ("DRM") technologies such as those described in commonly assigned, co-pending pending U.S. patent application Ser. No. 11/583, 693, "Digital Rights Management Engine Systems and Methods," filed Oct. 18, 2006 and published as U.S. Pub. No. 2007/0180519 A1 ("the '693 application"), and/or service orchestration and DRM technologies such as those described in commonly assigned U.S. Pat. No. 8,234,387, "Interoperable Systems and Methods for Peer-to-Peer Service Orchestration" ("the '387 patent"). It will be appreciated that these systems and methods are novel, as are many of the components, systems, and methods employed therein.

Figure 1:
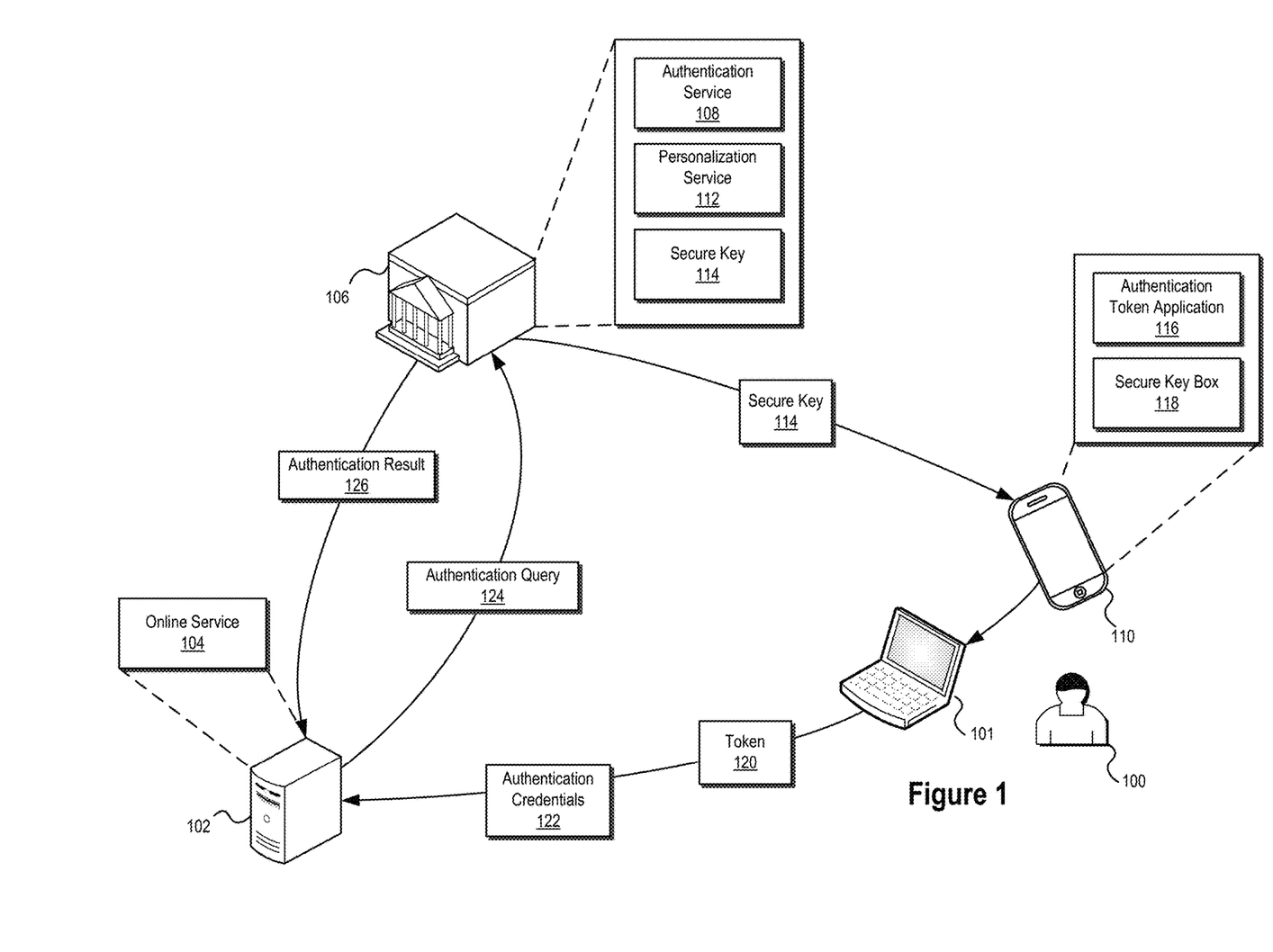
FIG. 1 illustrates a system for secure user authentication consistent with embodiments of the present disclosure.

FIG. 1 illustrates a system for secure user authentication consistent with embodiments of the present disclosure. In certain embodiments, a user 100 may wish to access a resource such as, for example, an online service 104 (e.g., an online financial account, database, etc.) managed by a service provider system 102. In certain embodiments, the user 100 may access the service provider's system 102 remotely using a mobile device 110 and/or a computer 101. In other embodiments, the user may access the service provider's system 102 directly (e.g., as might be the case with a point-of-sale terminal, ATM, kiosk, and/or the like). Thus, it will be appreciated that in some embodiments, some of the operations performed by systems 101, 102, and/or 110 may be combined or distributed differently than in the following illustrative description provided in connection with FIG. 1. Moreover, although illustrated in connection with an online service 104, it will be appreciated that the service provider system 102 may manage access to a variety of other types of resources that a user 100 may wish to access. For example, in some embodiments the service provider system 102 may comprise a physical access and/or inventory control system configured to manage physical access by one or more users to a protected area, certain inventory items, and/or the like.

Consistent with certain embodiments of the disclosed systems and methods, the service provider system 102 may implement a secure authentication process to validate that a user 100 has rights to access a managed resource. For example, in certain embodiments, by demonstrating knowledge of a secure token 120 to the service provider system 102 and/or another associated system, the user 100 may validate his or her right to access a resource managed by the service provider system 102. As discussed in more detail below, in certain embodiments the user 100 may use an authentication token application 116 executing on a client device 110 to generate a secure token 120. In some embodiments, the secure token 120 may be generated based, at least in part, on a secure key 114. In some embodiments, the secure key 114 may be provisioned to the client device 110 by a personalization service 112 of an authentication service system 106. In some embodiments, the authentication service system 106 may communicate with the service provider system 102 in connection with validating a secure token 120 provided to the system 102 (via, e.g., device 101 and/or 110) by the user 100. In certain embodiments, the authentication service system 106 may comprise an HTTP authentication service using a representational state transfer ("REST") API. Although illustrated as separate systems, it will be appreciated that in other embodiments, certain functions of the service provider system 102, the authentication service system 106, and/or client devices 101 and 110 may be performed by a single system and/or any suitable combination of systems.

The service provider system 102, the authentication service system 106, client device 110, client device 101, and/or one or more other associated systems (not shown) may comprise any suitable computing system or combination of systems configured to implement embodiments of the systems and methods disclosed herein. In certain embodiments, the service provider system 102, authentication service system 106, client devices 101 and/or 110, and/or other associated systems may comprise at least one processor system configured to execute instructions stored on an associated non-transitory computer-readable storage medium. As discussed in more detail below, the service provider system 102, authentication service system 106, client devices 101 and/or 110, and/or other associated systems may further comprise a secure processing unit ("SPU") configured to perform sensitive operations such as trusted credential and/or key management, token generation and/or validation, and/or other aspects of the systems and methods disclosed herein. The service provider system 102, authentication service system 106, client devices 101 and/or 110, and/or other associated systems may further comprise software and/or hardware configured to enable electronic communication of information between the systems 101, 102, 106, 110 via one or more associated network connections.

The service provider system 102, authentication service system 106, and/or client devices 101 and/or 110 may comprise a computing device executing one or more applications configured to implement embodiments of the systems and methods disclosed herein. In certain embodiments, the service provider system 102, authentication service system 106, and/or client devices 101 and/or 110 may comprise a laptop computer system, a desktop computer system, a smartphone, a tablet computer, a server system, a gaming system, an automated teller machine (ATM), a kiosk, and/or any other computing system and/or device that may be utilized in connection with the disclosed systems and methods. In certain embodiments, the service provider system 102, authentication service system 106, and/or client devices 101 and/or 110 may comprise software and/or hardware configured to, among other things, provision a secure key 114, generate a secure token 120, manage access to a resource, and/or validate the authenticity of a secure token 120. In some embodiments, such functionality may be implemented using one or more applications (e.g., authentication service 108, personalization service 112, authentication token application 116, and/or online service 104) executing on the service provider system 102, authentication service system 106, and/or client devices 101 and/or 110.

Certain of the disclosed embodiments may allow for a general purpose client device 110 to be used in connection with secure tag authentication and/or presence verification. For example, in certain embodiments, a general-purpose smartphone and/or tablet computing device executing an authentication token application 116 (e.g., an application provided by the authentication service system 106 and/or another trusted service provider for use in connection with secure token generation) may be utilized to implement certain aspects of the disclosed embodiments. In some embodiments, using a general-purpose smartphone and/or tablet computing device as a client device 110 may reduce costs of deployment and/or ease adoption of OTP-based authentication processes implementing embodiments of the disclosed systems and methods.

The various systems 102, 106, 110 may communicate via one or more networks comprising any suitable number of networks and/or network connections. The network connections may comprise a variety of network communication devices and/or channels and may utilize any suitable communication protocols and/or standards facilitating communication between the connected devices and systems. The network connections may, e.g., comprise the Internet, a local area network, a virtual private network, and/or any other communication network utilizing one or more electronic communication technologies and/or standards (e.g., Ethernet or the like). In some embodiments, the network connections may comprise a wireless carrier system such as a personal communications system ("PCS"), and/or any other suitable communication system incorporating any suitable communication standards and/or protocols. In further embodiments, the network connections may comprise an analog mobile communications network and/or a digital mobile communications network utilizing, for example, code division multiple access ("CDMA"), Global System for Mobile Communications or Groupe Special Mobile ("GSM"), frequency division multiple access ("FDMA"), and/or time divisional multiple access ("TDMA") technology. In certain embodiments, the network connections may incorporate one or more satellite communication links. In yet further embodiments, the network connections may utilize IEEE's 802.11 standards, Bluetooth®, ultra-wide band ("UWB"), Zigbee®, and or any other suitable communication protocol(s).

A user 100 wishing to authenticate with the online service 104 may have a client device 110 such as a mobile device personalized by a personalization service 112. The personalization service 112 may be associated with an authentication service system 106 and/or another trusted authority. To personalize the client device 110, a user 100 may first authenticate their identity and/or their rights to access the online service 104 with the authentication service system 106 and/or other trusted authority. In certain embodiments, username and/or password authentication, biometric authentication, personal identification number authentication, and/or any other suitable type of authentication technique may be utilized in connection with authenticating a user's identity and/or rights to access an online service 104 with the authentication service system 106 and/or other trusted authority.

In certain embodiments, user authentication may be performed in connection with a transaction involving the user 100, the service provider system 102 and/or online service 104, and/or the authentication service system 106. For example, the user 100 may wish to purchase rights to access the online service 104. As part of the purchase transaction, the user's rights to access the online service 104 and have an associated client device 110 personalized may be authenticated with the authentication service system 106 and/or other trusted authority.

Upon authenticating the user 100 with the authentication service system 106 and/or other trusted authority, the personalization service 112 may personalize the client device 110 for use in connection with secure OTP user authentication processes consistent with embodiments disclosed herein. In certain embodiments, as part of the personalization process, the client device 110 may be provisioned with a secure key 114 and/or other secret information that may be used to generate a secure OTP token 120. In some embodiments, the secure key 114 may be a key unique to the associated client device 110. Although embodiments disclosed herein are discussed in reference to a secure key 114, it will be appreciated that any other secret information that may be used to generate tokens, passwords, keys, and/or other credentials used in connection with embodiments of the OTP authentication processes may also be used. As discussed in more detail below, in certain embodiments, the secure key 114 provisioned to the client device 110 by the authentication service system 106 and/or other trusted authority may be stored in a secure key box 118 operating on the client device 110.

The client device 110 may be further provisioned with an authentication token application 116 configured to, among other things, allow a user 100 to request a secure token 120 be generated in connection with a secure OTP authentication process and/or to generate such a secure token 120. In certain embodiments, the authentication token application 116 may be provided to the client device 110 by the authentication service system 106 and/or another trusted authority. In further embodiments, the authentication token application 116 may be downloaded to the client device 110 from an online resource offering a variety of applications such as an "app store" or the like.

To authenticate his or her rights to access the online service 104, in some embodiments the user may first request that a secure token 120 be generated by the client device 110 and/or an authentication token application 116 executing thereon. In other embodiments, such a request can be made automatically by, e.g., the server 102 and/or the client application running on the user's device. Although some embodiments disclosed herein are discussed in reference to a secure token 120, it will be appreciated that other embodiments may utilize generated tokens, passwords, keys, and/or other credentials in connection with embodiments of the disclosed authentication processes. As discussed in more detail below, in certain embodiments, the secure token 120 may be generated in a protected processing environment such as, for example, a secure key box 118 configured to protect the secrecy and/or integrity of the secure key 114 and/or associated secure token generation algorithms during generation of the secure token 120.

In some embodiments, the secure token 120 may be generated based, at least in part, on the secure key 114. In certain embodiments, the secure token 120 may be generated by performing a calculation using the secure key 114 and other information shared between the client application 110 and the authentication service system 106 such as, for example, a value provided by a synchronized counter and/or clock. For example, in some embodiments, the secure token 120 may be generated by performing a cryptographic hash and/or digest calculation using the secure key 114 and a value provided by a clock. In further embodiments, the other information used in connection with generating the secure key 114 may be a shared non-random, random, and/or pseudorandom value. In certain embodiments, information used in connection with generating the secure token 120 (e.g., the secure key 144, values provided by a counter and/or clock, etc.) may be available to and/or otherwise synchronized or shared with both the client device 110 and/or the authentication service system 106. In some embodiments, the secure token 120 may be generated using a Time-based One-Time Password ("TOTP") algorithm.

The secure token 120 may be generated in a variety of other ways. For example, in some embodiments, the secure token 120 may be generated using an HMAC-based One-time Password ("HOTP") algorithm. In further embodiments, the secure token 120 may be generated based, at least in part, on a previously generated secure token. In yet further embodiments, the secure token 120 may be generated based, at least in part, on a response to a challenge provided by the user 100. It will be appreciated that a variety of other methods may be utilized in connection with generating the secure token 120, and that any suitable method or combination thereof may be used in connection with embodiments of the disclosed authentication processes.

The provisioned secure key 114 may be stored by the client device 110 in a protected processing environment such as a secure key box 118. In certain embodiments, the secure key box 118 may be configured to protect the secrecy and/or integrity of the secure key 114. The secure key box 118 may further protect software code used in connection with secure computations used to generate the secure token 120 by the client device 110. In some embodiments a protected processing environment and/or a secure processing unit such as described in commonly-assigned U.S. Pat. No. 7,430,585 ("the '585 patent") and/or U.S. Pat. No. 5,892,900 ("the '900 patent") could be used, each of which are hereby incorporated herein by reference.

In some embodiments, the secure key box 118 may use white-box cryptographic methods that allow the secure key 114 to remain encrypted, even during execution of associated secure token 120 generation methods. In certain embodiments, the secure key box 118 may enable the secure key 114 to be stored and/or used in connection with generating the secure token 120 without exposing the secure key 114 in clear text. For example, in some embodiments, the secure key box 118 may allow storage and/or use of the secure key 114 without exposing the secure key 114 in code and/or in memory of a client device 100 having an open architecture. In some embodiments, the secure key box is implemented using the secure key box technology offered by whiteCryption Corporation (see, e.g., cryptanium.com)

The secure key box 118 may be used in connection with both static keys and/or encrypted dynamic keys that may be loaded and/or decrypted at run time. In further embodiments, separate secure key boxes 118 associated with different client devices 110 may store and/or operate on secure keys 114 using different encryption formats. In certain embodiments, the secure key box 118 may enable protection of secure keys 114 and/or computations performed using the same without the use of dedicated security hardware included in the client device 110.

In some embodiments, secure information such as, for example, the secure key 114 may be encrypted when transmitted out of a secure key box 118. In certain embodiments, the secure key 114 may be managed by the authentication service system 106 in a separate secure key box operating thereon (not shown). When transmitted from the secure key box of the authentication service system 106 as part of a personalization process of the client device 110, the secure key box of the authentication service system 106 may encrypt the secure key 114 with a common export key shared with the secure key box 118 of the client device 110. Upon receipt by the client device 110, the secure key box 118 may decrypt the received encrypted secure key 114 using the common export key for use in connection with generating secure tokens 120.

Software obfuscation and/or integrity protection techniques may further be implemented in connection with the client device 110 to protect the secure key 114 and/or operations performed using the secure key 114 (e.g., computations used to generate the secure token 120). For example, in some embodiments, a variety of security techniques may be applied to software code performing operations utilizing the secure key 114 (e.g., outside and/or within the secure key box 118) including, without limitation, including integrity protection, obfuscation, anti-piracy, anti-debug, and shared library protection. In certain embodiments, integrated protection mechanisms may be applied at different layers of the associated software code. In some embodiments, software obfuscation and/or code checking techniques such as those describe in commonly assigned U.S. Pat. No. 6,668,325 B1, Obfuscation Techniques for Enhancing Software Security, U.S. patent application Ser. No. 11/102,306 (Publication No. 2005/0183072 A1), Software Self-Defense Systems and Methods; U.S. patent application Ser. No. 11/737,428 (Publication No. 2008/0028474 A1), Systems and Methods for Watermarking Software and Other Media; and/or U.S. patent application Ser. No. 10/172,682 (Publication No. 2003/0023856 A1), Software Self-Checking Systems and Methods, could be used, each of which are hereby incorporated herein by reference.

In some embodiments, integrity protection techniques may be used to prevent software code configured to perform operations using the secure key 114 from being modified by attacker. For example, in some embodiments, a number of integrity checkers may be inserted into the software code configured to monitor particular range in an associated binary file (e.g., an overlapping range of code). If an application is modified, the inserted checkers (e.g., checksums) may no longer match a previously generated binary footprint, and the application can defend itself by terminating the execution. In certain embodiments, checkers may be inserted in a manner such that they protect other checkers and are relatively difficult to detect and/or are time consuming to remove.

In some embodiments, software obfuscation techniques may be used to transform code associated with operations performed using the secure key 114 such that static analysis tools may face difficulty in identifying certain functions in an associated executable. A variety of software obfuscation techniques may be used to protect the secure key 114 and/or operations performed using the secure key 114 including, for example, obfuscating message calls in associated binary code, obfuscating string literals in code so that they are not easily readable and decoding such literals only before they are processed, inserting instances of anti-debug code into protected code, implementing security mechanisms that protect the integrity of code if it is detected to be executing on a jail broken client device 110, packing binary files such that associated executable binary code is encrypted with an appended stub that is decrypted into memory at run time, including defensive code configured to corrupt a program state of an associated application leading to a crash, and/or the like.

In certain embodiments, a secure token 120 may be generated by the client device 110 in response to a request from the user 120. In further embodiments, the secure token 120 may be generated automatically by the client device 100. In some embodiments, the generated secure token 120 may be updated over time (e.g., every 30 seconds or the like). For example, in embodiments where the secure token 120 is computed by computing a cryptographic hash of the secure key 114 and a value provided by a shared clock, the secure token 120 may be periodically updated as the clock value increments. In some embodiments, a user 100 may be provided with an indication as to when a secure token 120 will be periodically updated on the client device 110 (e.g., via a displayed counter or the like).

A user 100 wishing to access the online service 104 and/or another resource managed by the service provider system 102 may provide the service provider system 102 with certain authentication credentials 122 for use in determining whether the user has rights to access the online service 104 and/or managed resource. Consistent with embodiments disclosed herein, the authentication credentials 122 may comprise the secure token 120 generated by the client device. In further embodiments, the authentication credentials 122 may include a variety of other authentication information including, for example, username and/or other identification information associated with the user 100 and/or a password.

The service provider system 102 may generate an authentication query 124 based on the authentication credentials 122. The authentication query 124 may include, among other things, the secure token 120 provided by the user 100. The authentication query 124 may further include other authentication information included in the authentication credentials 122 (e.g., username, password, etc.), information regarding a service and/or resource the user 100 would like to access, and/or the like. The service provider system 102 may transmit the authentication query 124 to the authentication service system 106.

Upon receipt of the authentication query 124, the authentication service system 106 may perform an authentication process using, for example, an authentication service application 108 executing thereon. In certain embodiments, the authentication process may include generation of a secure token using, at least in part, a key 114 shared between the authentication service system 106 and/or the client device 110. For example, the authentication service system 106 may generate a secure token by performing a cryptographic hash or other computation using a shared secure key 114 and a value generated by a shared and/or otherwise synchronized clock. The secure token generated by the authentication service system 106 may be compared with the secure token 120 generated by the client device 110 provided by the user 100. If the secure tokens match, the user 100 may be authenticated. If the secure tokens do not match, the user 100 may not be authenticated. In some embodiments, the number of significant bits in the time value can be chosen to allow for a predefined margin of error between the server's clock and the client's (e.g., the time could be measure to the nearest minute).

In certain embodiments, the authentication service system 106 may determine whether the secure token 120 provided by the user matches a secure token that has been and/or could have been generated by the authentication service system 106 within a particular time period. That is, the authentication service system 106 may check that the secure token 120 is "fresh". If the secure token 120 is not a secure token that has been and/or could have been generated by the authentication system 106 within the particular time period (i.e., not "fresh"), the authentication service system 106 may determine that the secure token 120 is not authentic and/or is otherwise invalid, regardless of whether it may have been authenticated and/or valid if received by authentication service system 106 at an earlier time. In this manner, possible replay attacks using older secure tokens may be mitigated. In some embodiments, the authentication system 106 may calculate the token value based on the current time, as well as a predefined number of previous time intervals and/or future time intervals, and determine that the received token is fresh and authentic as long as there is a match between the received token and any of the tokens calculated in this window, thereby allowing for a possible lack of exact synchronicity between the client's clock and that of the server. For example, the server 106 could calculate tokens for the previous minute, the current time, and the next minute, and authenticate a token received from device 110 as long as it matches any one of these three values, thereby avoiding incorrect results because of small time differences on the client and server, delays in transmission between client and server, slow user entry of a token value, and/or the like.

An authentication result 126 indicating whether the authentication credentials 122 including the secure token 120 provided by the user 100 were validated by the authentication service system 106 may be sent to the service provider system 102. Based on the authentication result 126, the service provider system 102 may allow or restrict access to the online service 104 and/or other resource the user 100 wishes to access.

It will be appreciated that a number of variations can be made to the architecture and relationships presented in connection with FIG. 1 within the scope of the inventive body of work. For example, without limitation, in some embodiments, some or all of the functions performed by the authentication service system 106 may be performed by the service provider system 102. Similarly, some or all of the functions performed by client devices 101 and/or 110 may be performed by the service provider system 102. Thus it will be appreciated that the architecture and relationships illustrated FIG. 1 are provided for purposes of illustration and explanation, and not limitation.

Figure 2:
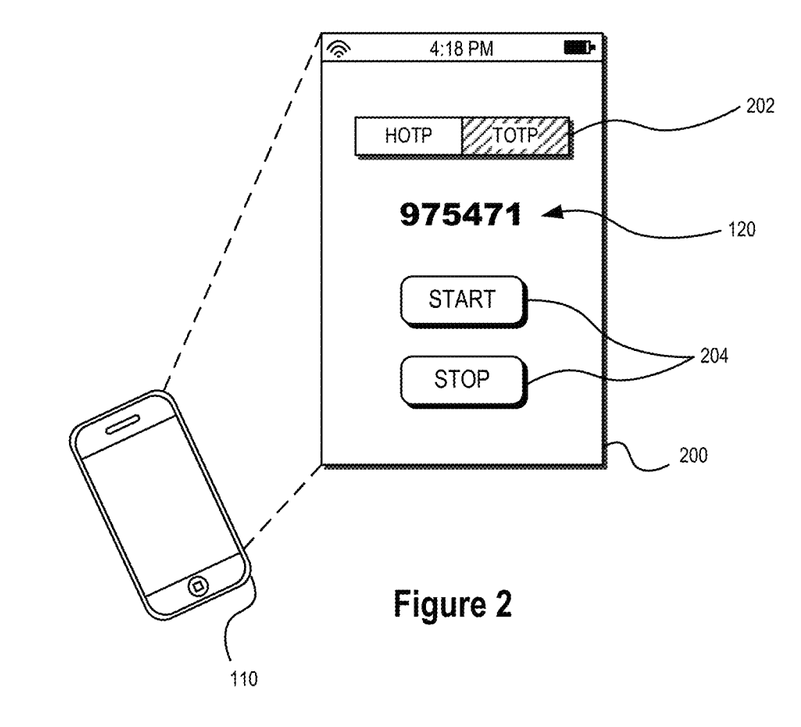
FIG. 2 illustrates an interface of a mobile application for secure user authentication consistent with embodiments of the present disclosure.

FIG. 2 illustrates an interface 200 of a mobile application for secure user authentication consistent with embodiments of the present disclosure. The interface 200 may, e.g., be displayed to a user using an associated client device 110. In some embodiments, a user may select a type of secure token 120 that the user would like the client device 110 to generate via a token selection menu 202. For example, as illustrated, a user may select HOTP token generation and/or TOTP token generation via the token selection menu 202. In other embodiments, the selection and/or generation of the token is performed automatically.

When a user would like to generate a secure token 120 using the client device 110, the user may initiate the token generation process by selecting one or more token generation elements 204 included in the interface 200. As illustrated, the secure token 120 may comprise a numerical token or code (e.g., a changing six-digit code or the like). In further embodiments, the secure token 120 may comprise an alphanumeric token or code. It will be appreciated that the client device 110 may generate a variety of types of security tokens 120, and that any suitable type of secure token 120 may be generated or used in connection with the disclosed embodiments.

In certain embodiments, the generated secure token 120 may be periodically updated (e.g., every 30 seconds or the like). For example, in embodiments where the secure token 120 is computed by computing a cryptographic hash of a secure key and a value provided by a shared clock, the secure token 120 may be periodically updated on the interface 200 as the clock value increments. In certain embodiments, a user of the client device 110 may terminate generation of new secure tokens 120 by selecting an appropriate token generation element 204 on the interface 200.

Figure 3:
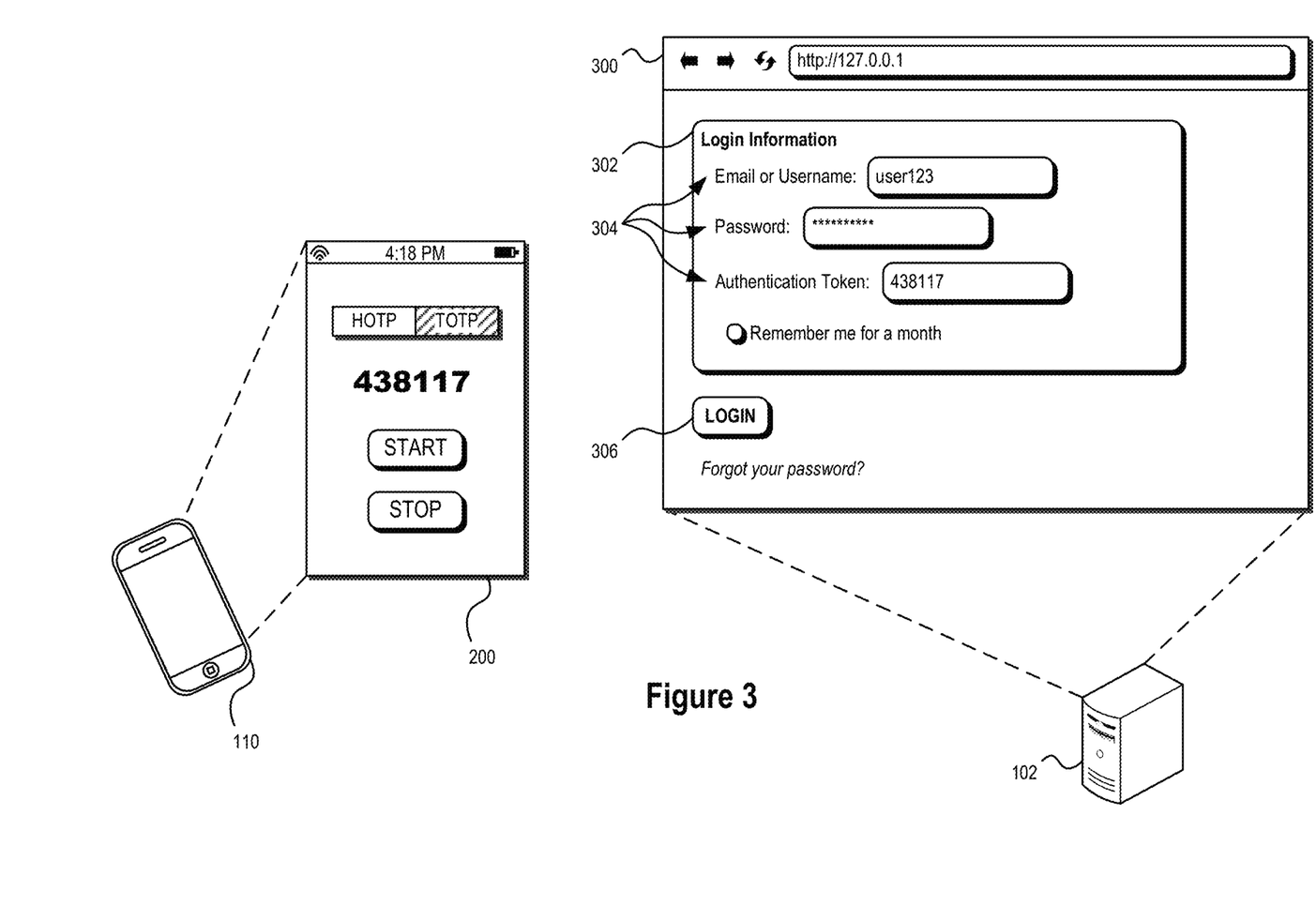
FIG. 3 illustrates a service interface implementing secure user authentication consistent with embodiments of the present disclosure.

FIG. 3 illustrates a service interface 300 implementing secure user authentication consistent with embodiments of the present disclosure. In certain embodiments, the service interface 300 may be associated with a service and/or another resource managed by a service provider system 102. In some embodiments, the service interface 300 may be displayed via a web-browser application. In further embodiments, the service interface 300 may be an interface of a discrete application.

A user wishing to access the service and/or other resource managed by the service provider system 102 may first be required to provide the service provider system 102 with certain authentication credentials for use in determining whether the user has rights to access the online service and/or managed resource. In certain embodiments, such credentials may be provided via a login information window 302 of the service interface 300. As illustrated, a user may provide a service and/or other managed resource a variety of authentication credentials via associated fields 304 in the login information window 302 including, without limitation, username and/or other identification information associated with the user (e.g., an e-mail address), password information, and/or a secure token generated using embodiments of the token generation processes disclosed herein, e.g., in connection with FIG. 3. After entering appropriate authentication credentials in the login information window 302, a user may select a login button 306 to initiate the authentication process with the service provider system 102.

Figure 4:
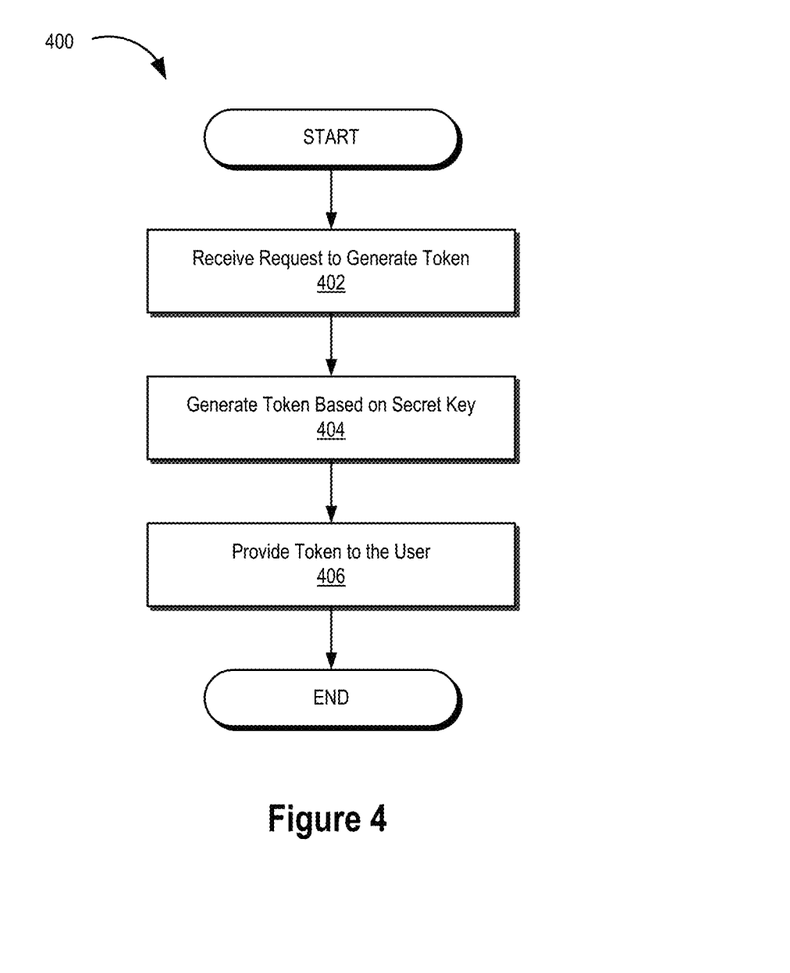
FIG. 4 illustrates a flow chart of a method for generating an authentication token by a mobile device consistent with embodiments of the present disclosure.

FIG. 4 illustrates a flow chart of a method 400 for generating an authentication token by a mobile device consistent with embodiments of the present disclosure. The illustrated method 400 may be implemented in a variety of ways, including using software, firmware, hardware, and/or any combination thereof. In certain embodiments, the method 400 may be implemented, at least in part, by an authentication token application and/or a secure key box executing on a client device as described above.

At 402, a request to generate a secure token may be received from a user and/or application running on the user's device. In certain embodiments, the request may comprise an indication of a type of secure token and/or a method of computation that is to be used to generate the secure token. For example, a user may specify that they would like to have a secure token generated using either HOTP token generation and/or TOTP token generation processes.

Based on the parameters of the request, a secure token may be generated at 404. Consistent with embodiments disclosed herein, the secure token may be generated based on a secure key provisioned to the client device by an authentication service system and/or another trusted authority. In addition to the secure key, the secure token may further be generated based on other information, such as a time value, challenge/response, or information shared between the client device and an authentication service system. For example, in some embodiments, the secure token may be generated by performing a cryptographic hash and/or digest calculation using a secure key and a value provided by a clock. At 406, the generated secure token may be provided to the user via an interface of a client device, for transmission to the server (e.g., by entering the value of the token on a web interface such as that shown in FIG. 3). In other embodiments, the secure token can be communication automatically and/or directly to the server. Using the secure token, the server can authenticate the user's right to access a service and/or managed resource.

Figure 5:
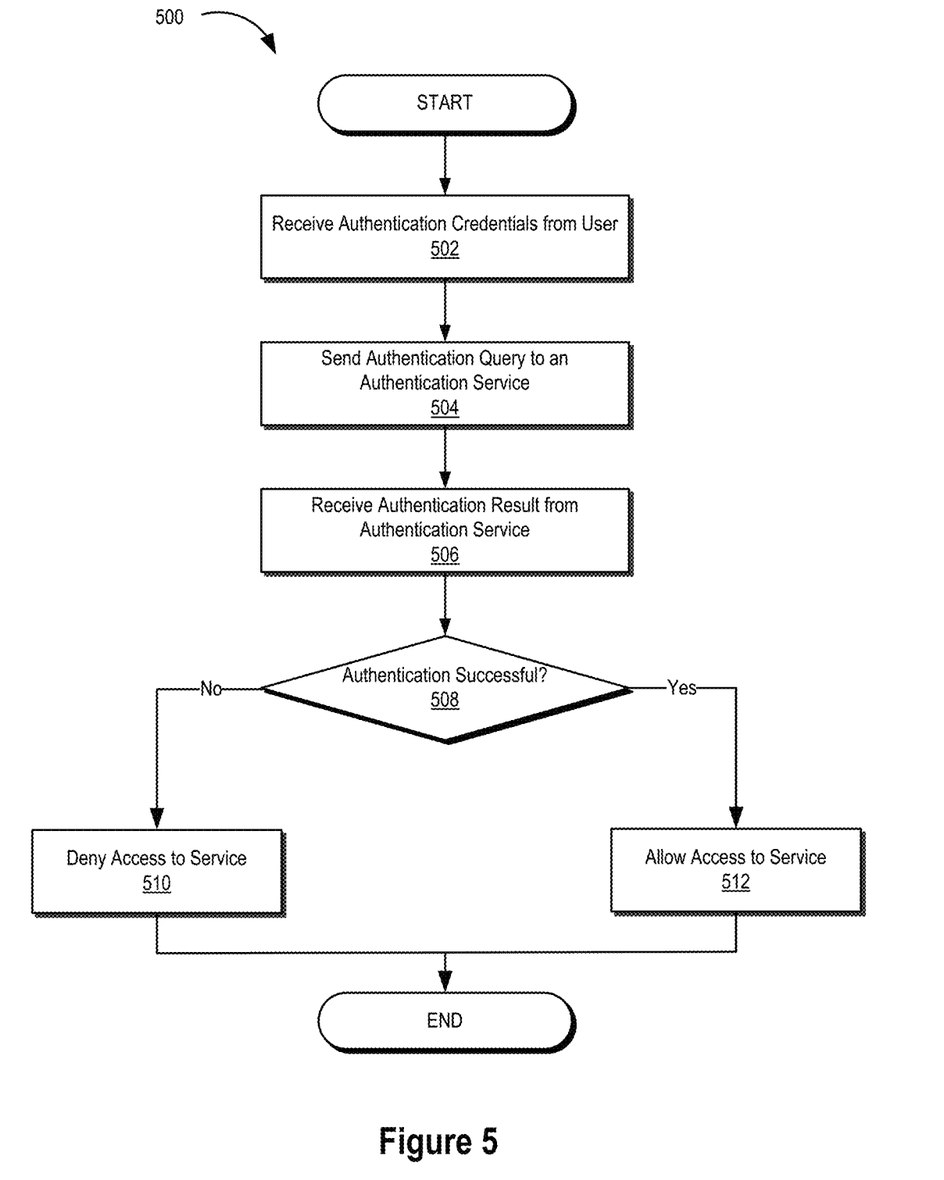
FIG. 5 illustrates a flow chart of a method for service provider authentication of a user consistent with embodiments of the present disclosure.

FIG. 5 illustrates a flow chart of a method 500 for service provider authentication of a user consistent with embodiments of the present disclosure. The illustrated method 500 may be implemented in a variety of ways, including using software, firmware, hardware, and/or any combination thereof. In certain embodiments, the method 500 may be implemented, at least in part, by a managed service and/or resource associated with a service provider system, as described above.

At 502, authentication credentials may be received from a user. The authentication credentials may include, without limitation, username and/or other identification information associated with the user (e.g., an e-mail address), password information, a secure token generated using embodiments of the token generation processes disclosed herein, and/or the like. An authentication query may be generated and sent to an authentication service at 504 based, at least in part, on the received authentication credentials. The authentication query may include, among other things, a secure token provided by the user included in the authentication credentials. The authentication query may further include other information included in the authentication credentials (e.g., username, password, etc.), information regarding a service and/or resource the user would like to access, and/or the like.

At 506, an authentication result may be received from the authentication service in response to the authentication query. At 508, a determination may be made whether the authentication result indicates that the authentication of the information included in the authentication query by the authentication service was successful. If the authentication was not successful, the user may be denied the requested access to the service and/or other managed resource at 510. If the authentication was successful, the user may be allowed the requested access to the service and/or other managed resource at 512.

Figure 6:
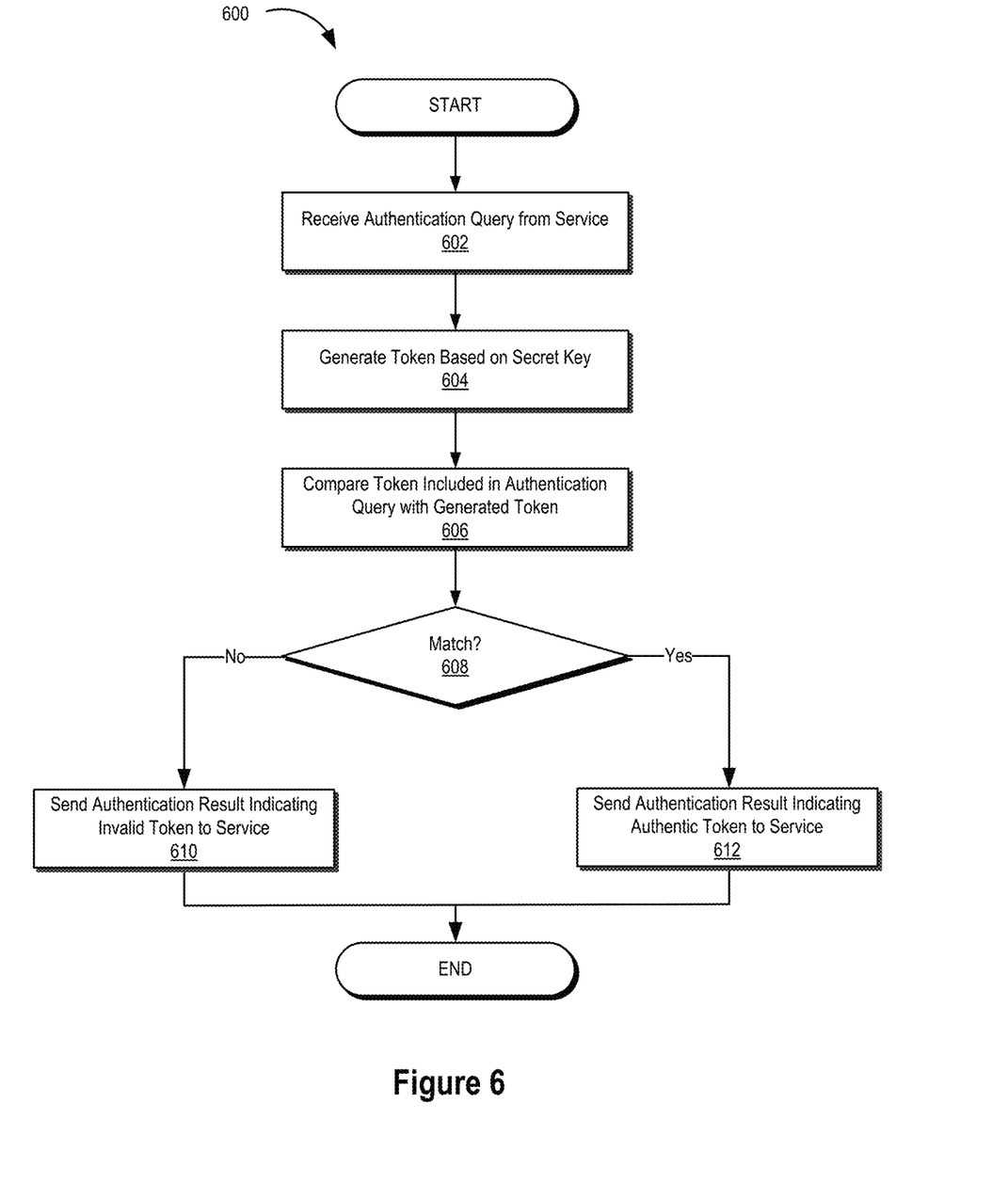
FIG. 6 illustrates a flow chart of a method for authenticating a user consistent with embodiments of the present disclosure.

FIG. 6 illustrates a flow chart of a method 600 for authenticating a user consistent with embodiments of the present disclosure. The illustrated method 600 may be implemented in a variety of ways, including using software, firmware, hardware, and/or any combination thereof. In certain embodiments, the method 600 may be implemented, at least in part, by an authentication service application and/or a secure key box associated with a authentication service system as described above.

At 602, an authentication query may be received from a service provider system managing a service and/or other resource. The authentication query may include, among other things, a secure token provided by the user, other authentication credentials (e.g., username, password, etc.), information regarding a service and/or resource the user would like to access, and/or the like.

At 604, a secure token may be generated by the authentication service system based on a secure key included in or derived from the authentication query received at 602. In addition to the secure key, the secure token may further be generated based on a current value of time, and/or other information shared between a client device and the authentication service system. For example, in some embodiments, the secure token may be generated by performing a cryptographic hash and/or digest calculation using a secure key and a value provided by a clock.

The secure token generated at 604 by the authentication service system may be compared at 606 with a secure token included in the authentication query generated by a client device associated with a user. At 608, a determination may be made based on the comparison regarding whether the secure token generated at 604 and the secure token included in the authentication query match. If the tokens do not match, an authentication result may be sent to the service provider system at 610 indicating that the secure token included in the authentication query is not valid. If the tokens match, an authentication result may be sent to the service provider system at 612 indicating that the secure token included in the authentication query is valid. Matching tokens may indicate that the secure token generated by the authentication service system and the secure token generated by client device were generated based on the same secure key and/or other information (e.g., synchronized clock values) and/or were generated using the same cryptographic computations. Based on the received authentication result, the service provider system may manage access to the service and/or resource by the user accordingly.

Figure 7:
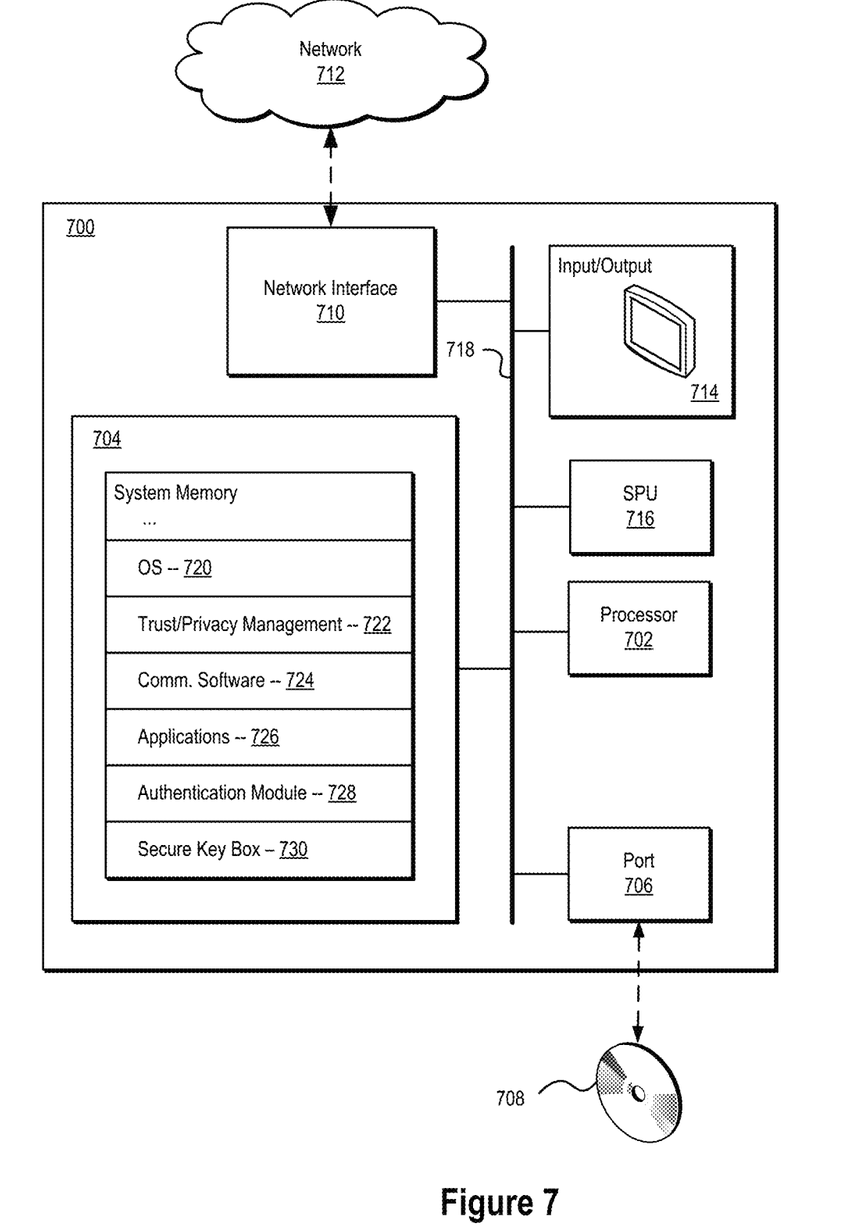
FIG. 7 illustrates a system that may be used to implement certain embodiments of the systems and methods of the present disclosure.

FIG. 7 illustrates a system 700 that may be used to implement certain embodiments of the systems and methods of the present disclosure. The system 700 may, for example, comprise a laptop computer system, a desktop computer system, a server computer system, a mobile device such as a smartphone or tablet, a gaming system, an ATM, a home appliance, and/or any other system or device configured to implement the systems and methods described herein. In certain embodiments, the system 700 may perform certain functions associated with an authentication service system or other trusted authority, a service provider system, a client device and/or any other system disclosed herein.

As illustrated in FIG. 7, system 700 may include: a processor 702; system memory 704, which may include high speed RAM, non-volatile memory and/or one or more bulk non-volatile computer-readable storage mediums (e.g., a hard disk, flash memory, etc.) for storing programs and other data for use and execution by the processor 702; a user interface 714 (e.g., an input/output interface) that may include a display and/or one or more input devices such as, for example, a touchscreen, a keyboard, a mouse, a track pad, and/or the like; a port 706 for interfacing with removable memory 708 that may include one more diskettes, optical storage mediums, and/or other computer-readable storage mediums (e.g., flash memory, thumb drives, USB dongles, compact discs, DVDs, etc.); a network interface 710 for communicating with other systems via a network 712 using one or more communication technologies; and one or more buses 718 for communicatively coupling the aforementioned elements.

In certain embodiments, network 712 may comprise the Internet, a local area network, a virtual private network, and/or any other communication network utilizing one or more electronic communication technologies and/or standards (e.g., Ethernet or the like). In some embodiments, the network interface 710 and/or network 712 may be part of a wireless carrier system, such as a PCS, and/or any other suitable communication system incorporating any suitable communication standards and/or protocols. In further embodiments, the network interface 710 and/or network 712 may be part of an analog mobile communications network and/or a digital mobile communications network utilizing, for example, the CDMA, GSM, FDMA, and/or TDMA standards. In still further embodiments, the network interface 710 and/or network 712 may incorporate one or more satellite communication links and/or utilize IEEE's 802.11 standards, near-field communication, Bluetooth®, UWB, Zigbee®, and/or any other suitable technology or technologies.

In some embodiments, the system 700 may, alternatively or in addition, include a SPU 716 that is protected from tampering by a user of system 700 or other entities by utilizing secure physical and/or virtual security techniques. An SPU 716 can help enhance and/or facilitate the security of sensitive operations such as private management and/or use of secure keys and/or other aspects of the systems and methods disclosed herein. In certain embodiments, the SPU 716 may operate in a logically secure processing domain and be configured to protect and operate on secret information. In some embodiments, the SPU 716 may include internal memory storing executable instructions or programs configured to enable to the SPU 716 to perform secure operations.

The operation of system 700 may be generally controlled by the processor 702 operating by executing software instructions and programs stored in the system memory 704 (and/or other computer-readable media, such as removable memory 708). The system memory 704 may store a variety of executable programs or modules for controlling the operation of the system 700. For example, the system memory 704 may include an operating system ("OS") 720 that may manage and coordinate, at least in part, system hardware resources and provide common services for execution of various applications, and a trust and privacy management system 722 for implementing trust and privacy management functionality including protection and/or management of secret information including secure keys. The system memory 704 may further include, without limitation, communication software 724 configured to enable, at least in part, communication with and by the system 700, applications 726 (e.g., personalization applications, authentication token generation applications, etc.), an authentication service application 728 configured to perform secure token authentication operations as disclosed herein, a secure key box 730 configured to protect secure keys and computations performed using the same (e.g., cryptographic computations), and/or any other information and/or applications configured to implement embodiments of the systems and methods disclosed herein.

One of ordinary skill in the art will appreciate that the systems and methods described herein can be practiced with computing devices similar or identical to that illustrated in FIG. 7, or with virtually any other suitable computing device, including computing devices that do not possess some of the components shown in FIG. 7 and/or computing devices that possess other components that are not shown. Thus it should be appreciated that FIG. 7 is provided for purposes of illustration and not limitation.

The systems and methods disclosed herein are not inherently related to any particular computer, electronic control unit, or other apparatus and may be implemented by a suitable combination of hardware, software, and/or firmware. Software implementations may include one or more computer programs comprising code/instructions that, when executed or interpreted by a processor or virtual machine, may cause a computer system to perform a method defined at least in part by the executable instructions. The computer program can be written in any form of programming language, including compiled or interpreted languages, and can be deployed in any form, including as a standalone program or as a module, component, subroutine, or other unit suitable for use in a computing environment. Further, a computer program can be deployed to be executed on one computer or on multiple computers at one site or distributed across multiple sites and interconnected by a communication network. Software embodiments may be implemented as a computer program product that comprises a non-transitory storage medium configured to store computer programs and instructions, that when executed by a processor, are configured to cause the processor to perform a method according to the instructions. In certain embodiments, the non-transitory storage medium may take any form capable of storing processor-readable instructions on a non-transitory storage medium. A non-transitory storage medium may be embodied in any suitable form, including, without limitation, a compact disk, digital-video disk, a magnetic tape, a magnetic disk, flash memory, integrated circuit, and/or any other non-transitory memory.

Although the foregoing has been described in some detail for purposes of clarity, it will be apparent that certain changes and modifications may be made without departing from the principles thereof. It should be noted that there are many alternative ways of implementing both the systems and methods described herein. Accordingly, the present embodiments are to be considered as illustrative and not restrictive, and the invention is not to be limited to the details given herein, but may be modified within the scope and equivalents of the appended claims.

What is claimed is:

1. A method performed by an authentication service system for authenticating a right of a user to access a resource managed by a service provider system, the method comprising:
    provisioning a client device associated with the user with a first secure key and at least one of a shared secret value common to the authentication service system and the client device and information that may be used to generate the shared secret value, wherein the client device includes software configured to securely store the first secure key in a protected processing environment and the at least one of the shared secret value and the information that may be used to generate the shared secret value;
    receiving, from the service provider system, authentication credentials provided to the service provider system by the user, the authentication credentials comprising a first secure token generated by the client device using, at least in part, the first secure key and the shared secret value;
    retrieving, based on the authentication credentials, a second secure key;
    generating, using the second secure key and the shared secret value common to the authentication service-system and the client device, a second secure token, wherein generating the second secure token comprises performing a computation using the second secure key and the shared secret value common to the authentication service system and the client device as inputs to the computation;
    comparing the first secure token with the second secure token;
    generating an authentication result based on a result of the comparison; and
    transmitting the authentication result to the service provider system.

2. The method of claim 1, wherein the method further comprises determining, based on the result of the comparison, that the first secure token matches the second secure token, wherein the authentication result comprises an indication that the first secure token is valid.

3. The method of claim 1, wherein the method further comprises determining, based on the result of the comparison, that the first secure token does not match the second secure token, wherein the authentication result comprises an indication that the first secure token is not valid.

4. The method of claim 1, wherein the computation comprises a cryptographic hash computation.

5. The method of claim 1, wherein the computation comprises a digest computation.

6. The method of claim 1, wherein the computation comprises a time-based one-time password ("TOTP") computation.

7. The method of claim 1, wherein the computation comprises a HMAC-based one-time password ("HOTP") computation.

8. The method of claim 1, wherein the shared secret value comprises a pseudorandom value.

9. The method of claim 1, wherein the shared secret value comprises a random value.

10. The method of claim 1, wherein comparing the first secure token with the second secure token comprises determining that the first secure token and the second secure token were both generated within a particular period of time.

11. The method of claim 1, wherein the managed resource comprises an online service.

12. The method of claim 1, wherein the managed resource comprises an inventory resource and the service provider system comprises an inventory control system.

13. The method of claim 1, wherein the managed resource comprises a protected area and the service provider system comprises a physical access control system.

14. The method of claim 1, wherein the first secure key and the second secure key are the same.

15. The method of claim 1, wherein the authentication credentials are received from the client device.

16. The method of claim 1, wherein the first secure token is generated by the client device within the protected processing environment.

17. The method of claim 1, wherein the authentication credentials comprise at least one of user identification information and a password.

18. The method of claim 1, wherein receiving the authentication credentials comprises receiving an authentication request comprising the authentication credentials.

19. The method of claim 1, wherein the information that may be used to generate the shared secret value comprises synchronized clock information.

20. The method of claim 18, wherein the authentication request comprises a request to access the resource.

* * * * *